United States Patent
Belknap, Jr.

(10) Patent No.: US 11,150,227 B2
(45) Date of Patent: Oct. 19, 2021

(54) MICROWAVE RESONATOR FLAME IONIZATION DETECTOR

(71) Applicant: Rosemount Inc., Shakopee, MN (US)

(72) Inventor: Curtis W. Belknap, Jr., Houston, TX (US)

(73) Assignee: Rosemount Inc., Shakopee, MN (US)

( * ) Notice: Subject to any disclaimer, the term of this patent is extended or adjusted under 35 U.S.C. 154(b) by 242 days.

(21) Appl. No.: 16/146,193

(22) Filed: Sep. 28, 2018

(65) Prior Publication Data

US 2019/0339237 A1 Nov. 7, 2019

Related U.S. Application Data

(60) Provisional application No. 62/666,168, filed on May 3, 2018.

(51) Int. Cl.
*G01N 30/68* (2006.01)
*G01N 30/78* (2006.01)
*G01N 30/02* (2006.01)

(52) U.S. Cl.
CPC .............. *G01N 30/68* (2013.01); *G01N 30/78* (2013.01); *G01N 2030/025* (2013.01)

(58) Field of Classification Search
CPC ........ G01N 30/02; G01N 30/68; G01N 30/76; G01N 30/78; G01N 2030/025
See application file for complete search history.

(56) References Cited

U.S. PATENT DOCUMENTS

| | | | | |
|---|---|---|---|---|
| 3,661,533 | A * | 5/1972 | David | G01N 30/68 422/54 |
| 2003/0085714 | A1* | 5/2003 | Keyes | G01N 27/626 324/464 |
| 2016/0073923 | A1 | 3/2016 | Szczepaniak et al. | |
| 2016/0178601 | A1 | 6/2016 | Harrison | |

OTHER PUBLICATIONS

Piejak et al, The hairpin resonator: A plasma density measuring technique revisited, Apr. 18, 2004, Journal of Applied Physics, vol. 95, Issue 7, p. 3785 (Year: 2004).*
International Search Report and Written Opinion dated Aug. 14, 2019 for International Patent Application No. PCT/US2019/030118, 14 pages.
P. Sandra, High Resolution Gas Chromatography, Third, K.J. Hyver, Ed. Hewlett-Packard Co., 1989.

(Continued)

*Primary Examiner* — Benjamin R Whatley
*Assistant Examiner* — Austin Q Le
(74) *Attorney, Agent, or Firm* — Christopher R. Christenson; Kelly, Holt & Christenson PLLC

(57) ABSTRACT

A microwave resonator flame ionization detector assembly includes a microwave resonator disposed proximate a flame to evaluate an ion concentration in a flame effluent. A resonant frequency of the microwave resonator is detected, and a reflection coefficient of the resonator is used to determine an electric permittivity of a material in which the resonator is immersed. The electric permittivity depends on an ion concentration proximal to the resonator, and the ion concentration is related to the concentration of hydrocarbons present in the flame.

18 Claims, 11 Drawing Sheets

(56) References Cited

OTHER PUBLICATIONS

Buffington, R. and Wilson, M.K., 1987. Detectors for gas chromatography: A practical primer. Hewlett-Packard.
Dewar, R.A., 1961, The flame ionization detector a theoretical approach. Journal of Chromatography A, 6, pp. 312-323.
Clements, R.M. and Smy, P.R., 1969. Electrostatic-Probe Studies in a Flame Plasma. Journal of Applied Physics, 40(11), pp. 4553-4558.
MacLatchy. C.S., 1979. Langmuir probe measurements of ion density in an atmospheric-pressure air-propane flame. Combustion and Flame, 36, pp. 171-178.
Clements, R.M. and Smy, P.R., 1970. Langmuir-probe measurement of electron temperature in a flowing high-density plasma. Electronics Letters, 6(17), pp. 538-539.
Jensen, D.E. and Travers, B.E.L., 1974. Flame plasma diagnostic techniques. IEEE Transactions on Plasma Science, 2(1), pp. 34-45.
Murphy, D.C., 2015. The measurement and application of electric effects in combustion (Doctoral dissertaiion, UC Berkeley).
Sands, B.L., Siefert, N.S. and Ganguly, B.N., 2007, Design and measurement considerations of hairpin resonator probes for determining electron number density in collisional plasmas. Plasma Sources Science and Technology; 16(4), p. 716.
Peterson, D.J., Kraus, P., Chua, T.C., Larson, L. and Shannon. S.C., 2017. Electron neutral collision frequency measurement with the hairpin resonator probe. Plasma Sources Science and Technology, 26(9). p. 095002.
Piejak, R.B., Al-Kuzee, J. and Braithwaite, N.S.J., 2005. Hairpin resonator probe measurements in RF plasmas. Plasma Sources Science and Technology, 14(4), p. 734.
"700xa gas chromatograph: System reference manual," Emerson Automation Solutions, <https://www.emerson.com/documents/automation/manual-700xa-gas-chromatograph-system-reference-rev-g-danalyzer-en-43426.pdf> Retrieved on Mar. 18, 2021, 204 pages.
First Chinese Office Action dated Mar. 23, 2021 for Chinese Patent Application No. 201910369744.3, 21 pages including English translation.

* cited by examiner

MICROWAVE RESONATOR FLAME IONIZATION DETECTOR

CROSS-REFERENCE TO RELATED APPLICATION

The present application is based on and claims the benefit of U.S. provisional patent application Ser. No. 62/666,168, filed May 3, 2018, the content of which is hereby incorporated by reference in its entirety.

BACKGROUND

Gas chromatography is the separation of a mixture of chemical compounds due to their migration rates through a chromatographic column. This separates the compounds based on differences in boiling points, polarity, or molecular size. The separated compounds then flow across a suitable detector, such as a flame ionization detector (FID), that determines the concentration of each compound represented in the overall sample. Knowing the concentration of the individual compounds makes it possible to calculate certain physical properties such as BTU or specific gravity using industry-standard equations.

In operation, a sample is often injected into a chromatographic column filled with a packing material. Typically, the packing material is referred to as a "stationary phase" as it remains fixed within the column. A supply of an inert gas is then provided to the column in order to force the injected sample through the stationary phase. The inert gas is referred to as the "mobile phase" since it transits the column.

As the mobile phase pushes the sample through the column, various forces cause the constituents of the sample to separate. For example, heavier components move more slowly through the column relative to lighter components. The separated components, in turn, exit the column in a process called elution. The resulting components are then fed into a detector that responds to some physical trait of the eluting components.

One type of detector is known as a flame ionization detector. The flame ionization detector is a device that measures an ion current that is produced when an electric field is imposed across a hydrocarbon flame. The flame ionization detector requires a very high gain analog amplifier due to the minute currents involved in most gas chromatographs. By incorporating such a high gain analog amplifier, the amplifier introduces several noise sources that have time-domain variations on the same time scale as the measured current. Additionally, the circuits are very sensitive to a number of factors, e.g. grounding issues, circuit board cleanliness, humidity, vibration, air currents, temperature variations, etc.

To reduce noise, gas chromatographs can also include multiple parallel amplifiers to reduce uncorrelated noise. However, in general, transistor noise is inversely proportional to its area. This means that low noise integrated amplifiers (for time-domain applications) face fundamental size limitations. Furthermore, such electronics are often fairly expensive for consumers.

SUMMARY

A microwave resonator flame ionization detector assembly includes a microwave resonator disposed proximate a flame to evaluate an ion concentration in a flame effluent. A resonant frequency of the microwave resonator is detected, and a reflection coefficient of the resonator is used to determine an electric permittivity of a material in which the resonator is immersed. The electric permittivity depends on an ion concentration proximal to the resonator, and the ion concentration is related to the concentration of hydrocarbons present in the flame.

DETAILED DESCRIPTION OF ILLUSTRATIVE EMBODIMENTS

In accordance with embodiments of the present invention, a gas chromatograph detector assembly is provided that is relatively small in size, easy to construct, insensitive to environmental factors and is highly sensitive to ions. The detector assembly includes a probe assembly and a meter that allows for a concentration of hydrocarbons, or other ions, to be determined within a sample as will be discussed further with respect to FIGS. 3-9. However, in accordance with different examples, the probe assembly of the detector is largely insensitive to the many factors facing current gas chromatograph detectors. This includes measurement noise, high cost, and spatial limitations within the gas chromatograph. Additionally, while the present description will proceed with respect to a detector for a gas chromatograph, it is expressly contemplated that the present detector may also be used in a wide variety of other applications or other types of chromatographs as well.

Figure 1:
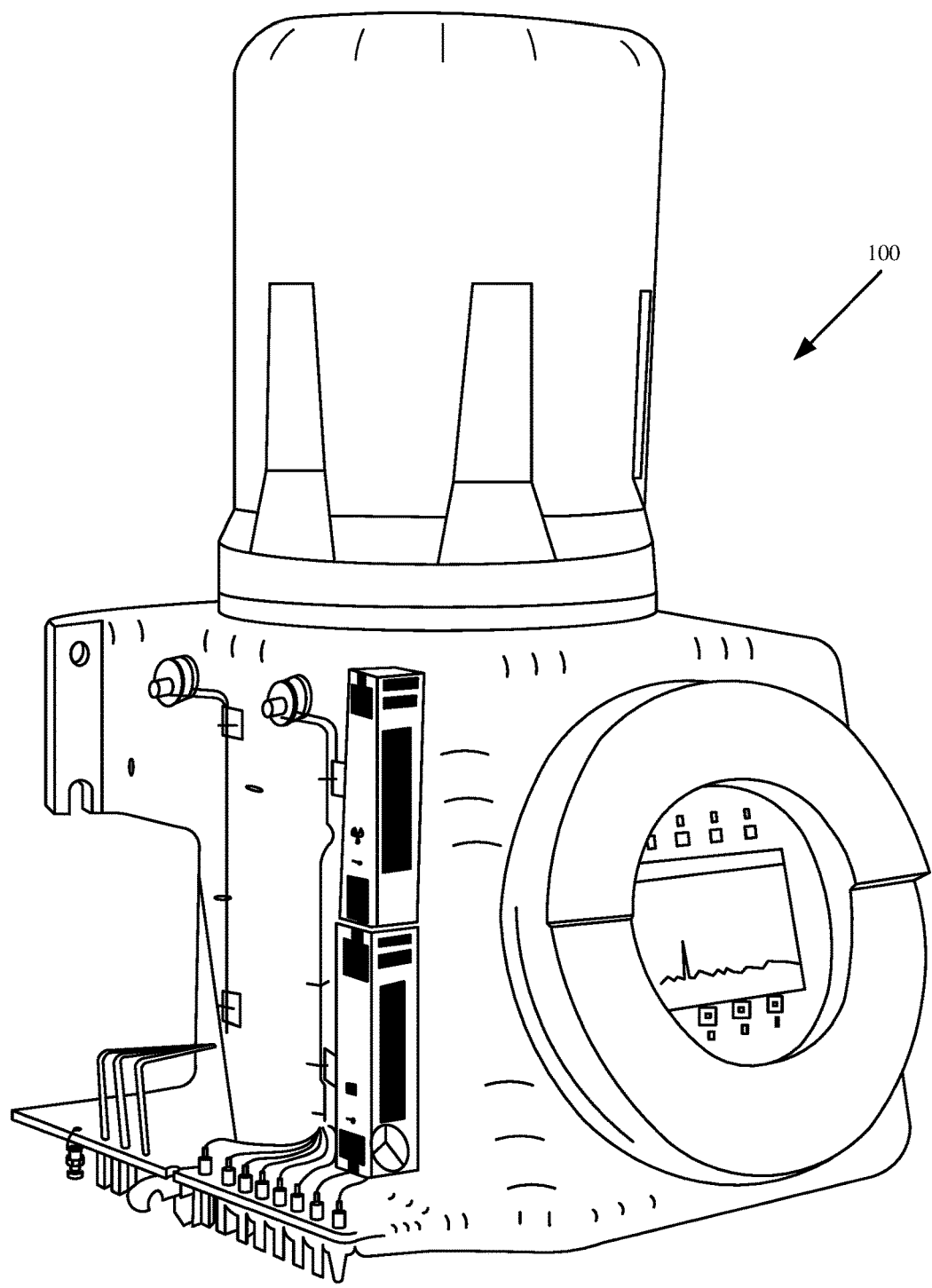
FIG. 1 is a diagrammatic view of a gas chromatograph with which embodiments of the present invention may be used.

FIG. 1 is a diagrammatic view of a gas chromatograph with which embodiments of the present invention may be used. While FIG. 1 illustrates a model 700XA gas chromatograph 100, available from Rosemount Inc., methods and embodiments provided herein may be utilized with other exemplary gas analyzers. This can include model 1500XA Process Gas Chromatographs and model 570 Natural Gas Chromatographs, both available from Rosemount Inc., among a variety of other types and models of gas chromatographs. Additionally, it is contemplated that a wide variety of other devices, beyond gas chromatographs, can be utilized with embodiments of the present invention.

Figure 2:
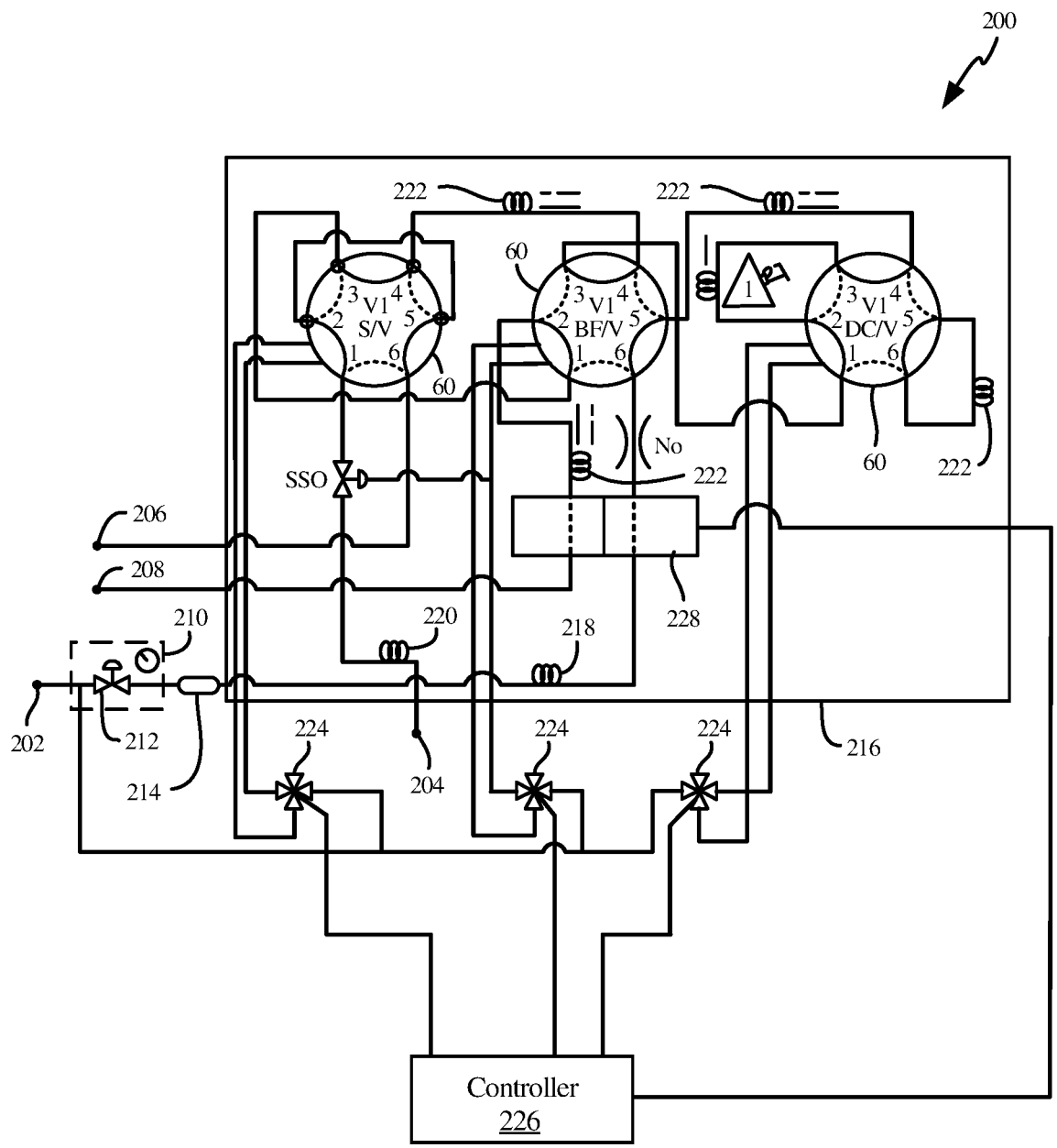
FIG. 2 is a diagrammatic system view of a gas chromatograph in accordance with an embodiment of the present invention.

FIG. 2 is a diagrammatic system view of a gas chromatograph in accordance with an embodiment of the present invention. While one example of a gas chromatograph 200 will now be provided, it is to be understood that gas chromatograph 200 can take a wide variety of other forms and configurations. For example, it is to be understood that gas chromatograph 200 may have other configurations for columns, valves, detectors, etc. However, in this example, gas chromatograph 200 illustratively includes a carrier gas inlet 202, a sample inlet 204, a sample vent outlet 206 and a measure vent outlet 208. In operation, carrier gas is provided to flow panel 210 where it passes through a regulator 212 and dryer 214 before entering analyzer oven 216 and passing through carrier gas pre-heater 218.

During measurement, sample gas enters chromatograph 200 via sample inlet 204 and passes through sample gas pre-heater 220 within analyzer oven 216. Both sample gas (during measurement), or calibration gas (during calibration), and carrier gas eventually enter a plurality of pneumatically-controlled multiport selector valves 60 in order to selectively flow various volumes of a sample and/or carrier gas through various chromatographic columns 222 in accordance with known gas chromatography techniques. Each of pneumatically-controlled multiport selector valves 60 is fluidically coupled to a respective solenoid 224 that receives its control signal from controller 226.

Additionally, as shown in FIG. 2, each pneumatically-controlled multiport selector valve 60 has a pair of states. In the first state, the fluidic connections of each valve 60 are shown in solid lines. The fluidic connections of each valve 60 in the second state are shown in phantom. Controller 226 is also operably coupled to detector 228 which allows for an ion concentration within a sample to be determined as will be discussed with respect to FIG. 3. Thus, controller 226 is able to fully control flow through gas chromatograph 200 by virtue of controlling solenoids 224. Additionally, controller 226 is able to determine the response of detector 228 to determine an ion concentration. In this way, controller 226 is able to selectively introduce the sample into a chromatographic column for a selected amount of time, reverse the flow of gas through the chromatographic column; and direct the reverse flow through the detector to observe and/or record the detector response over time. This provides chromatographic analysis relative to the sample.

Figure 3:
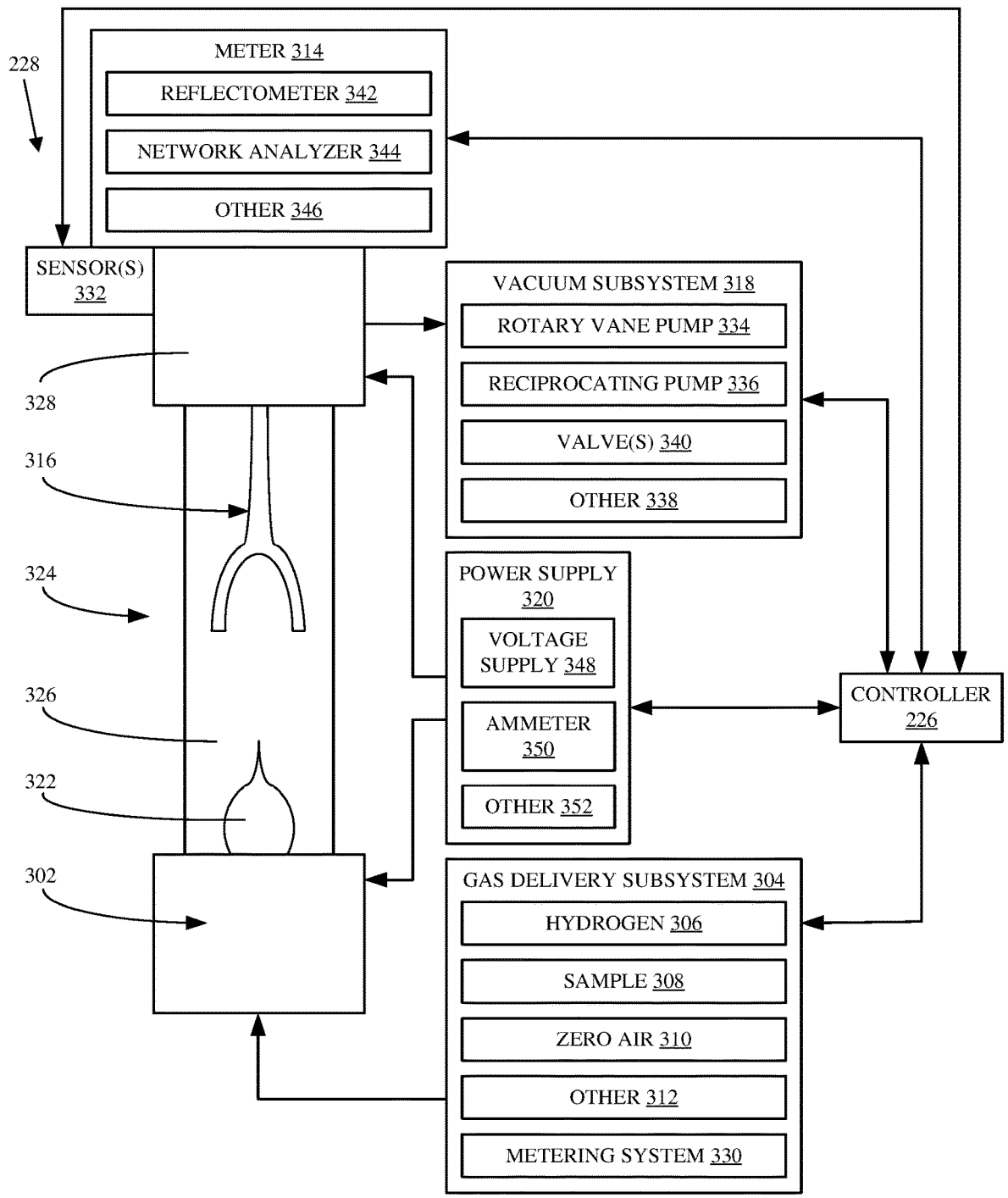
FIG. 3 is a diagrammatic view of a gas chromatograph detector assembly in accordance with an embodiment of the present invention.

FIG. 3 is a diagrammatic view of a gas chromatograph detector assembly in accordance with an embodiment of the present invention. Detector 228 illustratively includes a burner assembly 324, a probe assembly 316, a gas delivery subsystem 304, a power supply 320, a vacuum subsystem 318, a meter 314, sensor(s) 332, and a controller 226.

Briefly, to determine a concentration of ions within an eluted sample from any or all chromatographic columns 222, the eluted sample is mixed with hydrogen and, along with an ignition source and zero air, is used to generate flame 322 within burner assembly 324. When the eluted sample is mixed with hydrogen and serves as a fuel source for flame 322, an ion-electron pair is produced upon combustion of the mixed sample within burner assembly 324. A dc bias can then be imposed across flame 322 using power supply 320 to prevent recombination of the disassociated ion-electron pair. As flame 322 burns within burner assembly 324, an ion concentration of sample 308 is determined using probe assembly 316 and meter 314. For example, meter 314 can measure scattering parameters, such as a $S_{11}$ scattering factor, of probe assembly 316 as the flame effluent acts on probe assembly 316. Based on the scattering factor, a resonant frequency, $f_r$, and quality factor, $Q_r$, of probe assembly 316 can be determined which, in turn, allows for an ion concentration to be determined as will be discussed later.

Burner assembly 324 illustratively includes an envelope 326, an end cap 328 configured to simultaneously couple to meter 314 and probe assembly 316, and a burner cell 302 configured to receive a gas sample from gas delivery subsystem 304 and generate a flame 322. Envelope 326 can comprise glass (such as PYREX® from Corning Incorporated) among a variety of other compounds. Additionally, both end cap 328 and burner cell 302 can each be formed of aluminum or any other metal alloy. In operation, envelope 326 can be fixed to both end cap 328 and burner cell 302 using an epoxy, such a glass bonding epoxy in one example. Additionally, while it is to be understood that envelope 326 can take a variety of configurations, in one example, envelope 326 includes a glass tube with a length of 300.0 mm, an outer diameter of 24.92 mm and an inner diameter of 18.57 mm. However, this is for example only and it is to be understood that envelope 326 can take a variety of other configurations as well.

Sensor(s) 332 can include a wide variety of different types of sensors that allow controller 226 to monitor a reaction or environment within envelope 326. For example, sensor(s) 332 can include a temperature sensor that allows controller 226 to determine an operating temperature within or outside of envelope 326. However, a variety of other sensor(s) 332 can be used as well.

Gas delivery subsystem 304 is configured to receive the eluted products from any or all of chromatographic columns 222 and provide the eluted products to burner cell 302. Gas delivery subsystem 304 illustratively includes a source of hydrogen 306, a source of zero air 310, eluted sample(s) 308 from chromatographic columns 222, a metering system 330, and a variety of other components 312. Metering system 330 can meter each of hydrogen 306, zero air 310 and/or eluted sample(s) 308 into specific amounts prior to providing the mixture to burner cell 302. Additionally, metering system 330 can also combine the metered hydrogen 306, zero air 310 and/or eluted sample(s) 308 into specific mixtures prior to delivering the samples to burner cell 302. For example, metering system 330 can meter and combine hydrogen 306 with the eluted sample(s) 308 prior to providing the mixture to burner cell 302. This is but one example.

Vacuum subsystem 318 is coupled to burner assembly 324 and allows for burner assembly 324 to operate at sub-atmospheric pressures. Vacuum subsystem 318 illustratively includes a rotary vane pump 334, a reciprocating pump 336, valve(s) 340, among other components 338. In one example, valve(s) 340 can include a needle valve and/or a globe valve to allow the pressure within burner assembly 324 to be set between atmospheric pressure and the maximum pressure achievable through rotary vane pump 334 and/or reciprocating pump 336. In operation, vacuum subsystem 318 can be coupled to an exhaust port of end cap 328 as will be discussed with respect to FIG. 4.

Meter 314 illustratively monitors structural characteristics of probe assembly 316 during operation of detector 228. Meter 314 can include a reflectometer 342, a network analyzer 344, or a variety of other detectors 346. In one example, meter 314 includes reflectometer 342 configured to monitor an $S_{11}$ parameter of probe assembly 316 as the flame effluent acts on probe assembly 316. Based on the determined parameters, controller 226 can receive the signals from meter 314 and determine a resonant frequency, $f_r$, and quality factor, $Q_r$, of probe assembly 316. Once the resonant frequency is determined for probe assembly 316, controller 226 can determine an electric permittivity surrounding probe assembly 316. The electric permittivity depends on the ion concentration proximate probe assembly 316 which, in turn, is directly related to a concentration of ions present within flame 322. Therefore, by determining a resonant frequency for probe assembly 316, controller 226 can determine an ion concentration within flame 322 and, in effect, an ion concentration within any or all received sample(s) 308 from chromatographic columns 222.

Power supply 320 generates a voltage to selectively bias probe assembly 316 relative to flame 322 to maintain a disassociation between an ion-electron pair created through flame 322. In one example, power supply 320 can include a voltage supply 348, an ammeter 350 and a variety of other components 352. In one example, voltage supply 348 can be connected to burner assembly 324 to maintain end cap 328 and probe assembly 316 at ground potential while selectively biasing burner cell 302 and flame 322 to a predetermined voltage between −1.0 [kV] to +1.0 [kV]. However, this is but one example.

Controller 226 is operably coupled to meter 314, sensor(s) 332, vacuum subsystem 318, power supply 320 and gas delivery subsystem 304 and serves to determine an ion concentration within sample 308 by controlling and receiving signals from meter 314 indicative of scattering parameters of probe assembly 316. Additionally, in one example, controller 226 is a microprocessor with suitable memory such that controller 226 is able to programmatically execute a series of program steps in order to carry out the functions and calculations mentioned above with respect to meter 314, sensor(s) 332, vacuum subsystem 318, power supply 320 and gas delivery subsystem 304. In operation, controller 226 receives signals from meter 314 indicative of scattering parameters of probe assembly 316, determines a resonant frequency and quality factor of probe assembly 316 based on the parameters, and calculates an electric permittivity based on the resonant frequency and quality factor. Based on the electric permittivity, controller 226 can determine an ion concentration proximate probe assembly 316 and, in turn, within flame 322 and sample 308.

Probe assembly 316 is coupled to burner assembly 324 and undergoes a characteristic modification upon being acted on by the flame effluent. Probe assembly 316 includes a resonator, a feed line, fasteners and an adapter as will be discussed in detail with respect to FIG. 5. Briefly, however, as the flame effluent acts on the resonator, scattering parameters of the resonator are monitored by meter 314 in which a resonant frequency and quality factor are able to be determined for probe assembly 316. Using the resonant frequency, an electric permittivity can be calculated and used to determine a concentration of ions proximate probe assembly 316.

Figure 4:
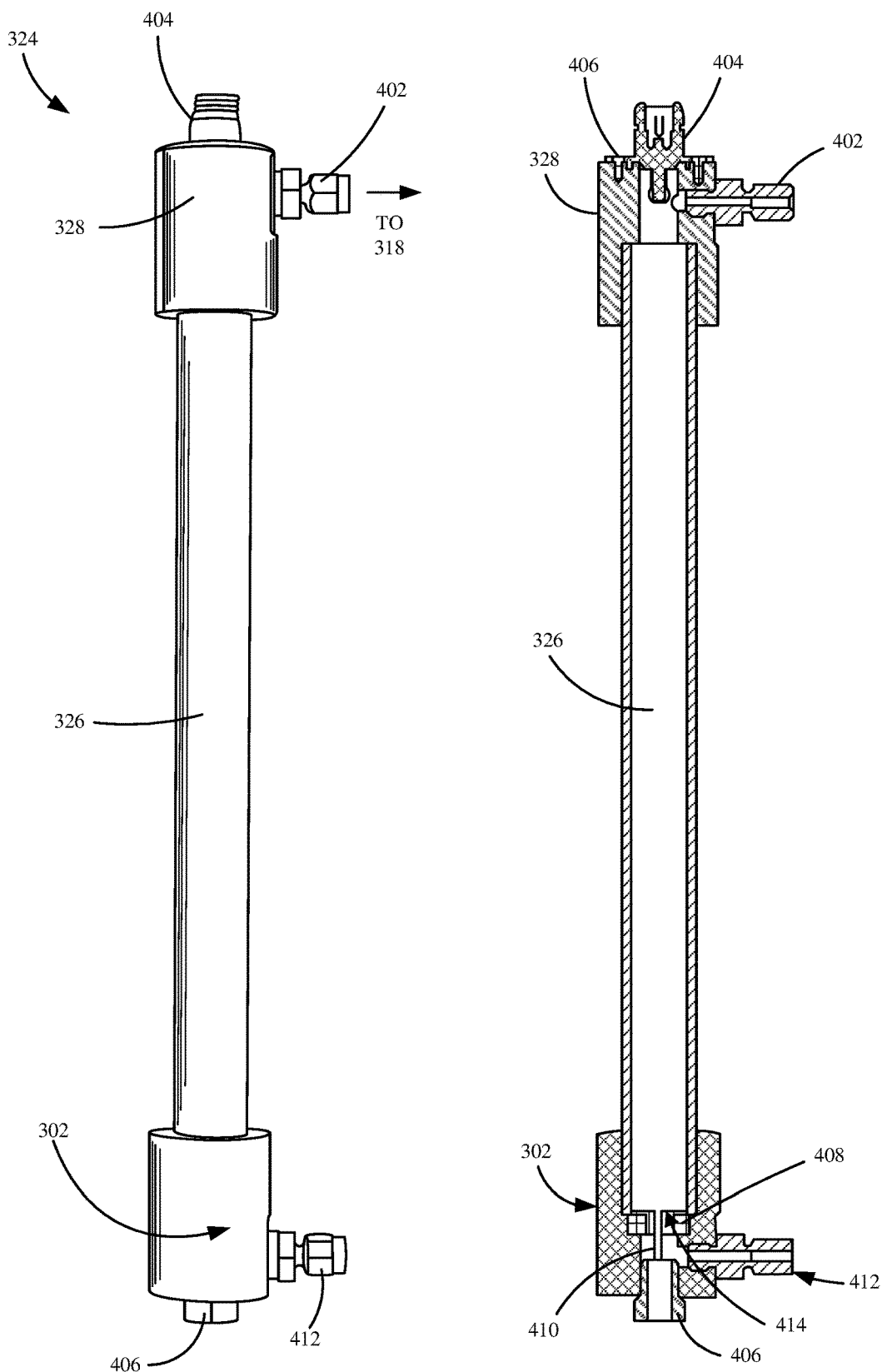
FIG. 4 is a diagrammatic view of a burner assembly in accordance with an embodiment of the present invention.

FIG. 4 is a diagrammatic view of a burner assembly in accordance with an embodiment of the present invention. Burner assembly 324 illustratively includes envelope 326, burner cell 302 and end cap 328. As illustratively shown, end cap 328 is coupled to an adapter 404 and includes an exhaust port 402 that, in operation, can couple to vacuum subsystem 318. Adapter 404 can be used to couple probe assembly 316 to detector 228 and, in one example, includes a type N to SMA adapter configured to simultaneously couple to both meter 314 and probe assembly 316 as illustratively shown in FIG. 5. In one example, adapter 404 can be coupled to end cap 328 using a sealing member 406, which, in one example, can include an O-ring.

Furthermore, as illustratively shown, burner cell 302 includes a pressed insert 408, a burner tip 410, a port 412, a threaded plug 406 and an ignitor 414. In operation, pressed insert 408 can orient burner tip 410 such that, when flame 322 is produced, it is oriented directly underneath probe assembly 316 (shown in FIG. 3). Additionally, port 412 and threaded plug 406 can simultaneously couple to gas delivery subsystem 304 to receive any or all of hydrogen 306, zero air 310, sample 308, etc. For example, port 412 can couple to gas delivery subsystem 304 to receive zero air 310. Threaded plug 406, similarly, can couple to gas delivery subsystem 304 to receive a mixture of hydrogen 306 and sample 308 in one example.

Ignitor 414 can include a variety of ignitors that are able to ignite combustion of received samples from gas delivery subsystem 304. In one example, ignitor 414 can include a glow-wire ignitor formed from a length of stainless steel tubing with an insulating platform to serve as a mounting point for the glow-wire. In this example, the insulating platform can comprise Ultem and the glow-wire NiCr wire. The glow-wire can be coupled to a power supply which may be the same or different than power supply 320. In operation, ignitor 414 can be inserted through the passageway of end cap 328 and placed in close proximity of burner tip 410. Power supply 320 can then generate current over the glow-wire to ignite the received samples from gas delivery subsystem 304.

Figure 5:
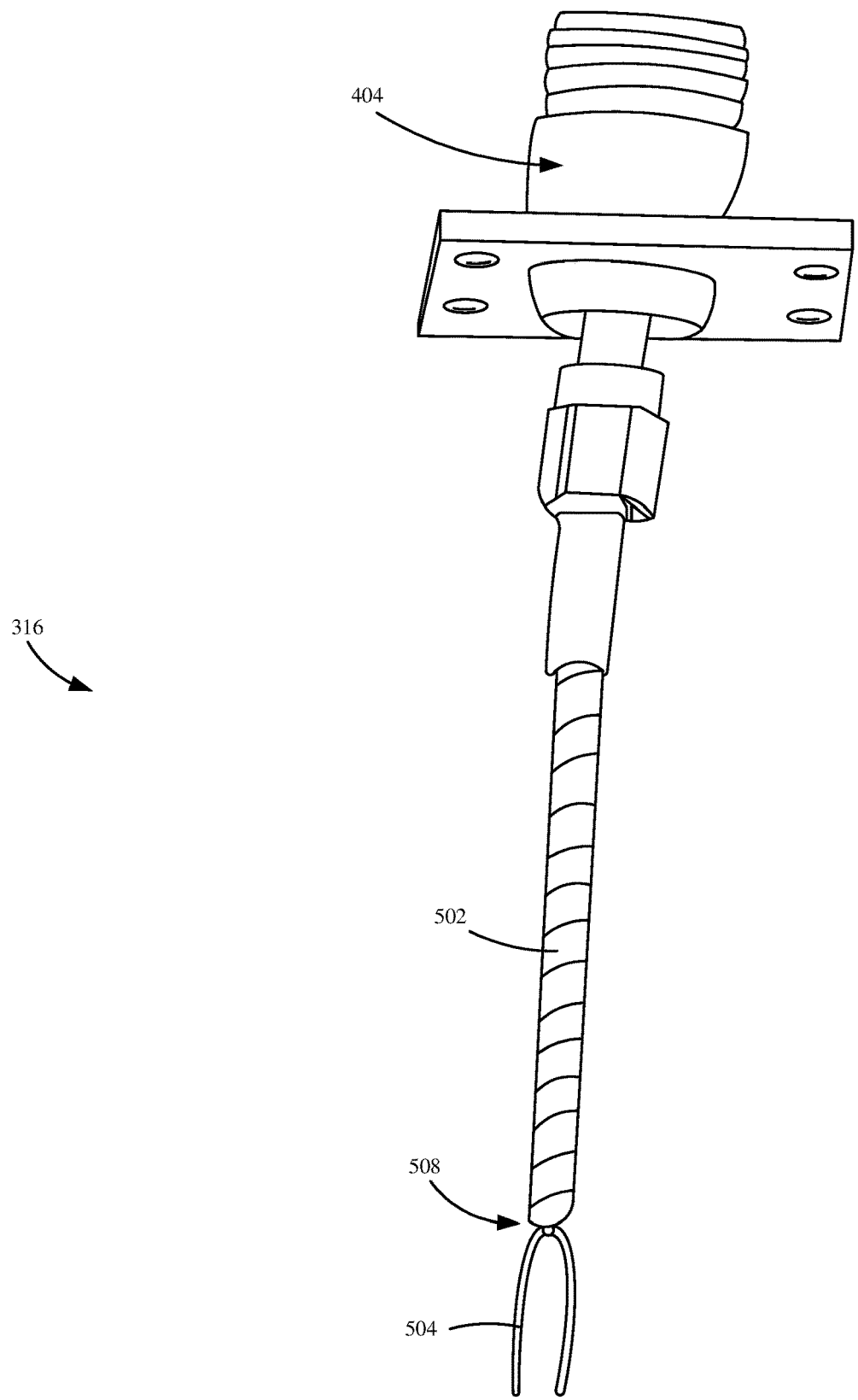
FIG. 5 is a diagrammatic view of a probe assembly in accordance with an embodiment of the present invention.

FIG. 5 is a diagrammatic view of a probe assembly in accordance with an embodiment of the present invention. Probe assembly 316 illustratively includes a resonator 504, a coupling mechanism 508, a feed line 502 and adapter 404. While resonator 504 is illustratively in the form of a hairpin resonator, a variety of other resonators can be used as well. However, in one example, resonator 504 has a length of 20.0 mm, a tine radius of 0.51 mm, an aspect ratio of 3.34 and a drive separation of 0.60 mm. Additionally, in some examples, resonator 504 can be formed of a plated annealed steel wire having a plating material of silver, a plating thickness of 6.00 μm, a RMS surface roughness of 7.30 μm and a diameter of 0.51 mm. The plated wire can be used since the skin depth for silver at the hairpin resonator nominal frequency ($f_r$=3.50 [GHz]) is 1.07 [μm]. In one example, the plating thickness is much larger than the skin depth to ensure the RF current does not interact with the steel core. However, it is contemplated that resonator 504 can have a variety of other configurations as well.

Feed line 502 is configured to simultaneously couple to resonator 504 and adapter 404. In one example, feed line 502 comprises a coax cable. For example, feed line 502 can include a 110 [mm] length of RG402 coax from Fairview Microwave®. However, feed line 502 can include other types of coax cable as well. In operation, feed line 502 is coupled to adapter 404. Adapter 404 can include a variety of types of adapters, but, in one example, includes a type-N to SMA adapter configured to couple meter 314 to feed line 502.

In operation, to ensure critical coupling between resonator 504 and feed line 502, coupling mechanism 508 is utilized to ensure maximum transfer of signal energy between resonator 504 and feed line 502. In one example, coupling mechanism 508 maximizes a signal-to-noise ratio (SNR) of the measured parameters, $f_r$ and $Q_r$, through a direct coupling to resonator 504. This is illustratively shown in FIG. 6A-6B. By having a critical coupling, meter 314 can accurately determine scattering parameters for resonator 504 as will be discussed further with respect to FIGS. 6A-6B.

Figure 6A:
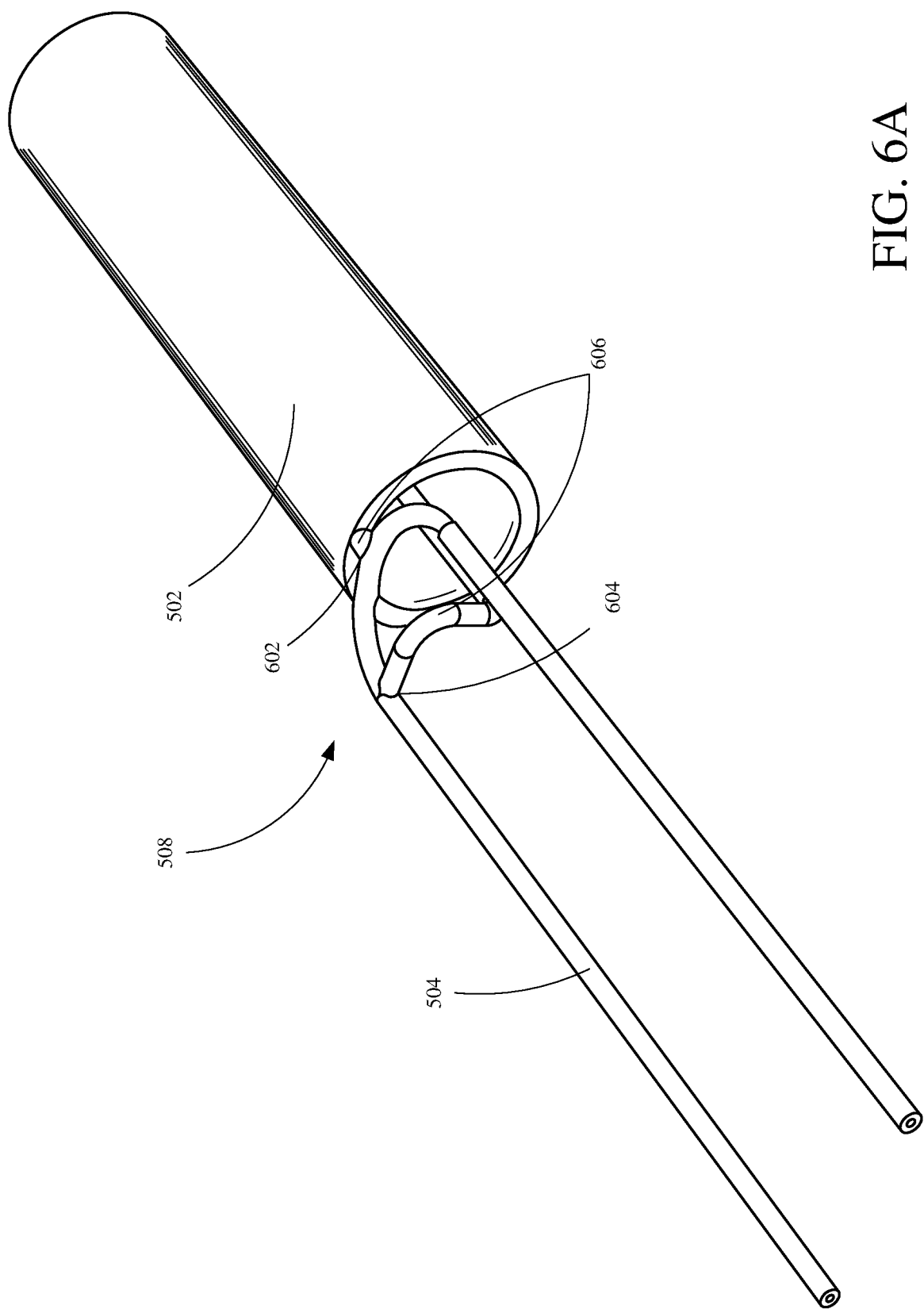
FIGS. 6A-6B are diagrammatic views of a resonator coupling in accordance with an embodiment of the present invention.
Figure 6B:
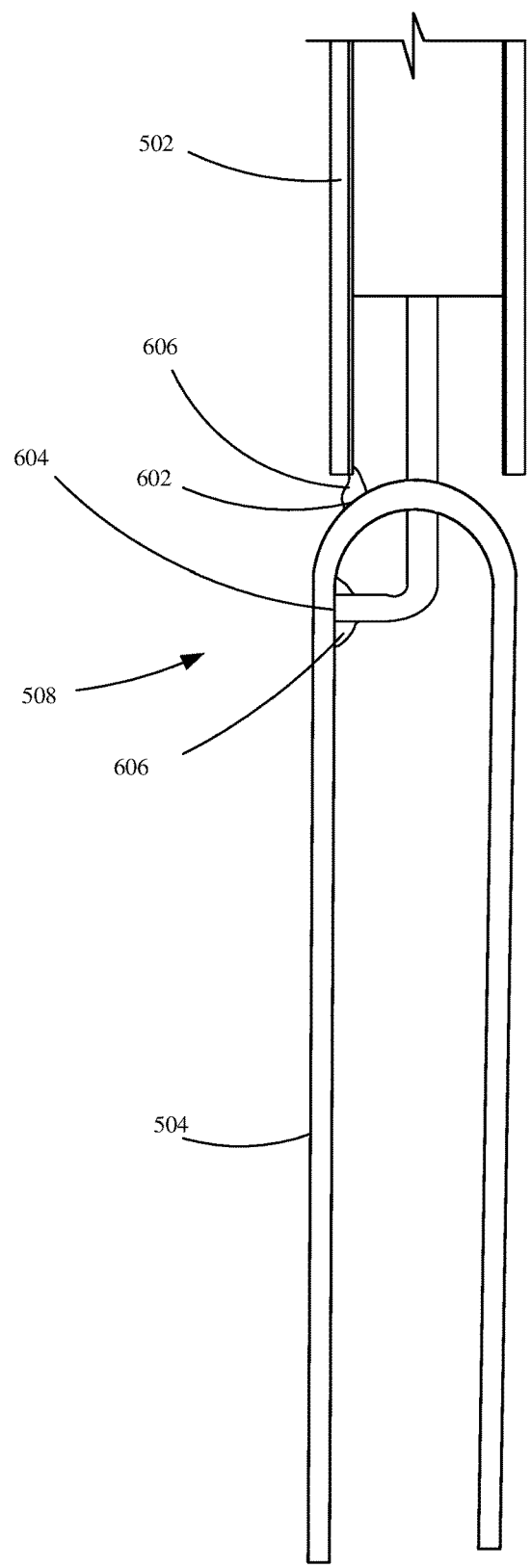

FIGS. 6A-6B are diagrammatic views of a resonator coupling in accordance with an embodiment of the present invention. While one example of a coupling mechanism 508 will be discussed for resonator 504 and feed line 502, it is contemplated that other coupling mechanisms 508 can be utilized as well that maximize a signal-to-noise ratio (SNR) of the measured parameters. However, in this example, coupling mechanism 508 includes a solder 606 that directly couples resonator 504 and feed line 502. In one example, solder 606 couples to junctions 604 and 602 of resonator 504, however, solder 606 can directly couple to other junctions as well.

As illustratively shown in FIG. 6B, coupling mechanism 508 includes solder 606 that directly couples to junctions 602 and 604 to optimize measurement of scattering parameters of resonator 504. In one example, this allows for the accurate measurement of a resonant frequency and quality factor of resonator 504 during which a flame effluent acts on resonator 504 within a burner assembly.

Figure 7:
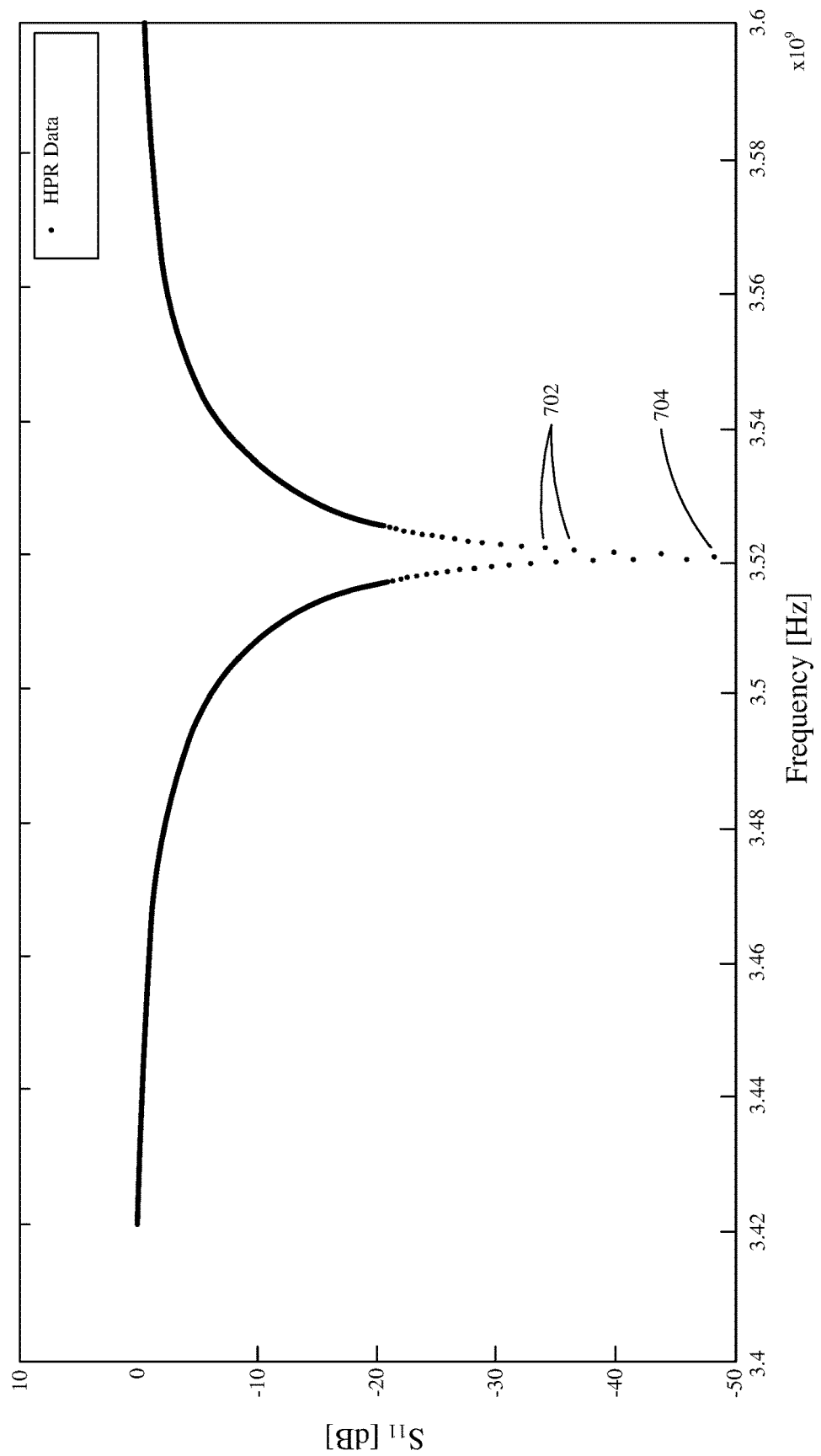
FIG. 7 is a graph illustratively showing scattering parameters of a resonator in accordance with an embodiment of the present invention.

FIG. 7 is a graph illustratively showing scattering parameters of a resonator in accordance with an embodiment of the present invention. As illustratively shown, $S_{11}$ parameters 702 for resonator 504 of probe assembly 316 were monitored and plotted as flame effluent acted on probe assembly 316 within burner assembly 324. Additionally, from the graph, it can be observed that a critical coupling was maintained for resonator 504 and feed line 502 as the observed resonant notch is tall and narrow. From this, a resonant frequency of 3.52 [Hz] can be observed for resonator 504.

Figure 8:
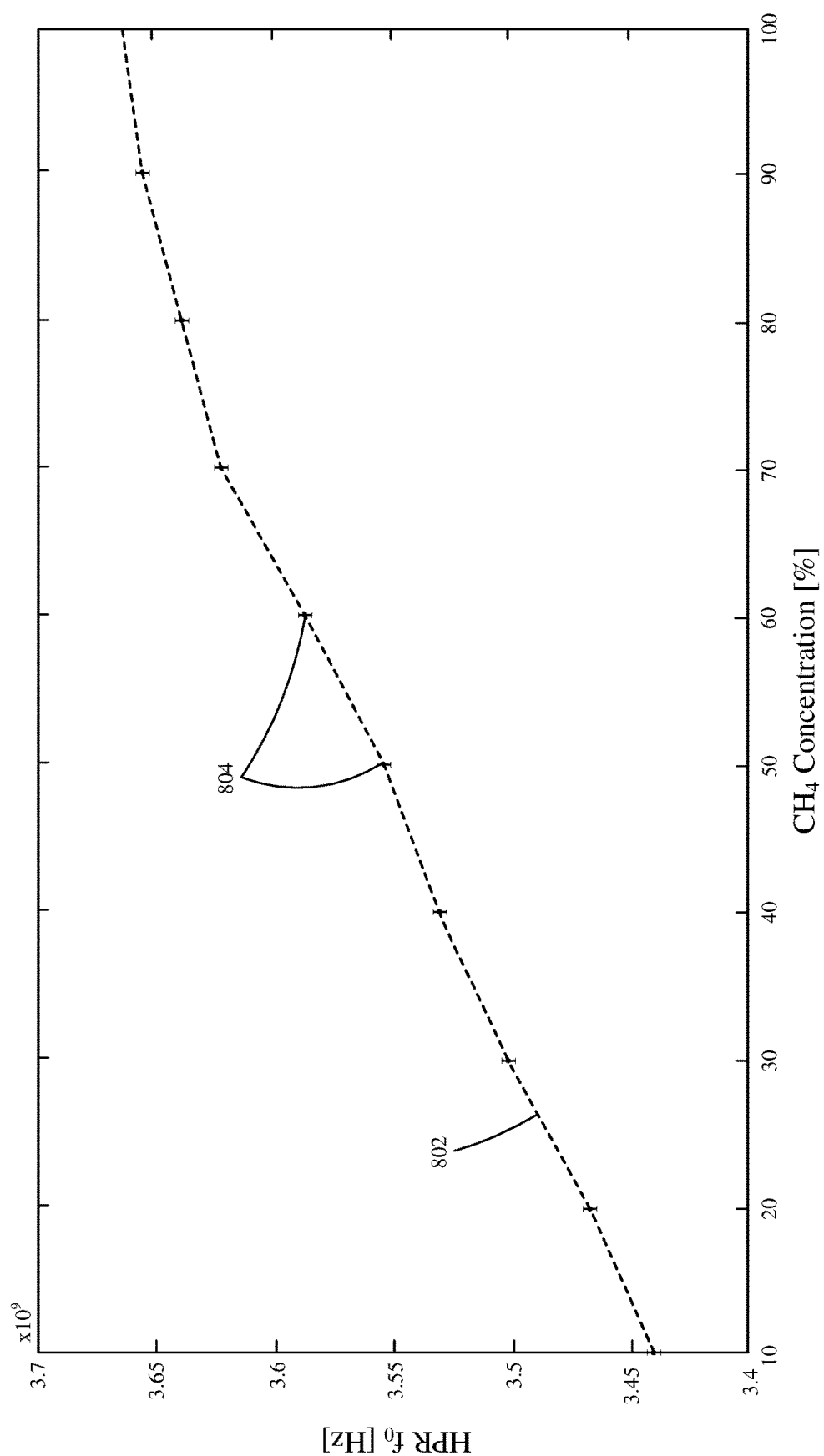
FIG. 8 is a graph illustratively showing resonant frequencies of a resonator as a concentration of gas is increased in accordance with an embodiment of the present invention.

FIG. 8 is a graph illustratively showing resonant frequencies of a resonator as a concentration of gas is increased in accordance with an embodiment of the present invention. As illustratively shown, as the hydrocarbon/hydrogen concentration ratios were increased within a sample, an observed shift in resonant frequency, $f_r$, was exceptionally linear as shown by line 802. The plotted points 804 correspond to a mean value of 100 $S_{11}$ readings while the error bars represent a population standard deviation of the points.

Figure 9:
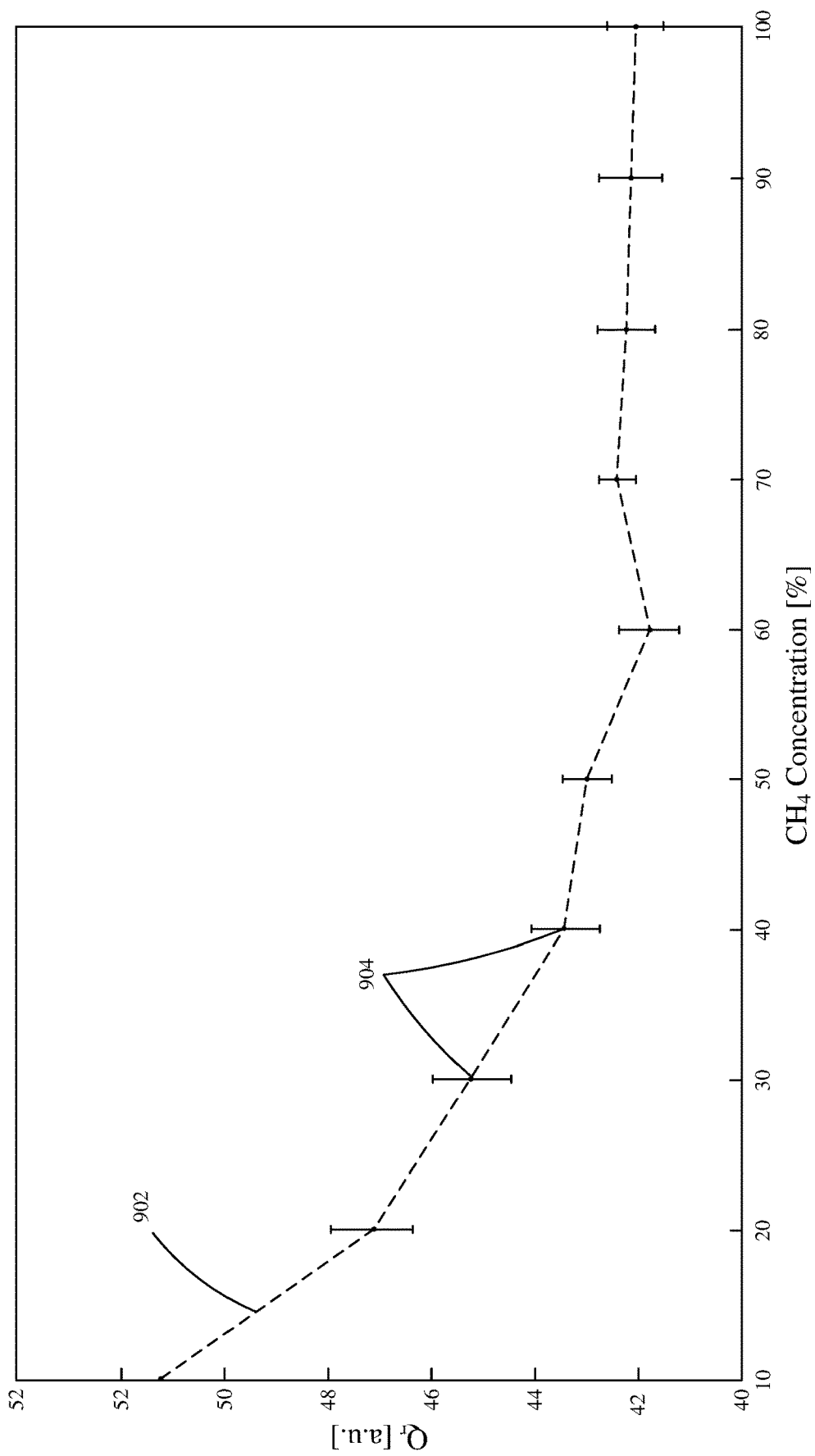
FIG. 9 is a graph illustratively showing quality factors of a resonator as a concentration of gas is increased in accordance with an embodiment of the present invention.

FIG. 9 is a graph illustratively showing quality factors of a resonator as a concentration of gas is increased in accordance with an embodiment of the present invention. From the graph, it can be illustratively seen that the resonator Q factor was observed to decrease at a relatively constant rate prior to leveling off as a hydrocarbon/hydrogen concentration was increased within a sample. In one example, this can be attributed to oxidation (tarnishing) of the silver plating used on the resonator wire. Through an oxidation of the silver plating, a resistance of the resonator tines is increased while also reducing the resonator Q factor. As shown, Q-factors were plotted 904 and a best-fit-line 902 fit to the data points.

Figure 10:
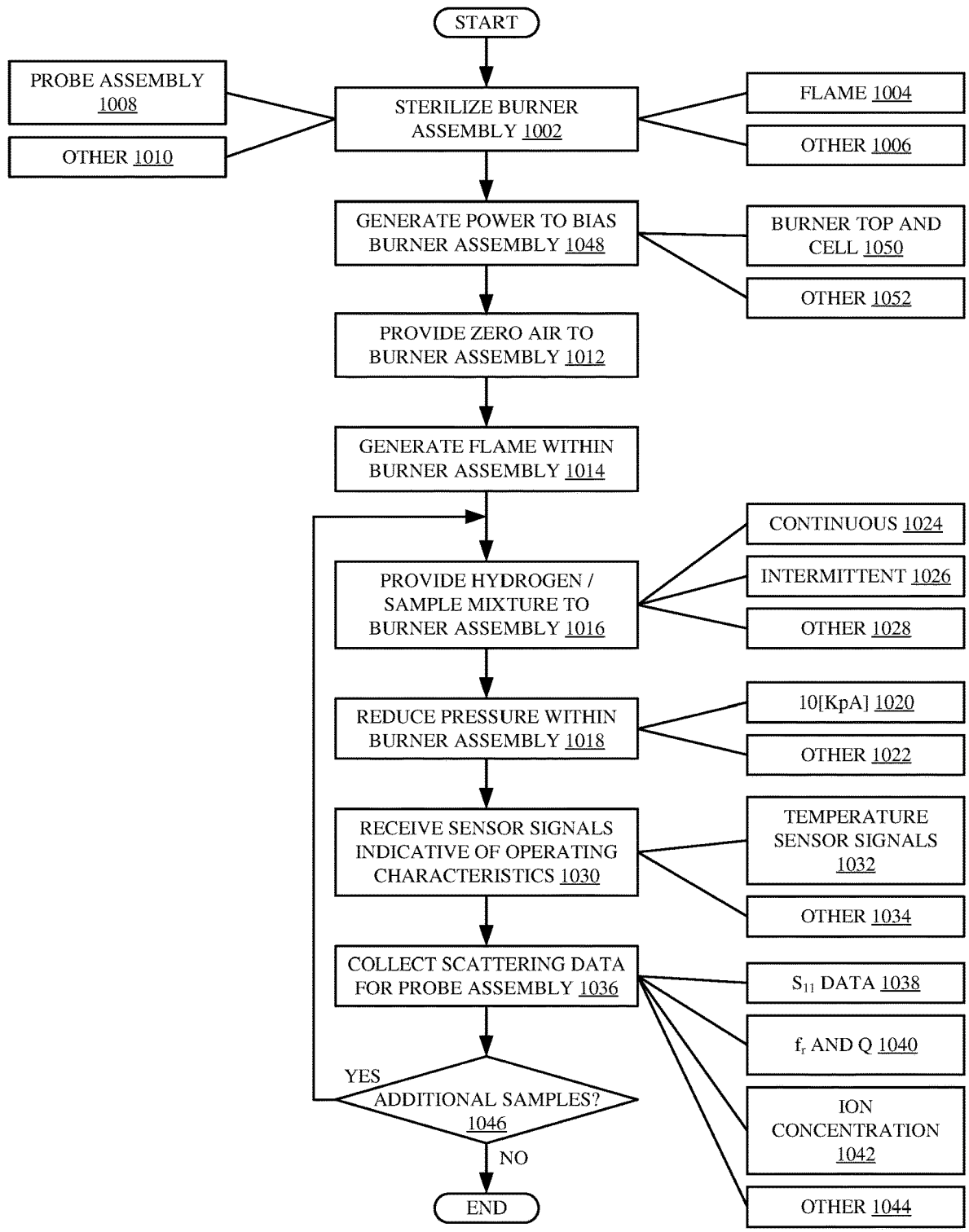
FIG. 10 is a method of determining an ion concentration within a sample in accordance with embodiments of the present invention.

FIG. 10 is a method of determining an ion concentration within a sample in accordance with embodiments of the present invention. It is to be understood that method 1000 can be utilized in a variety of different chromatographs to determine an ion concentration within a sample.

Processing begins at block 1002 where burner assembly 316 is sterilized. In one example, probe assembly 316 can be sterilized along with burner assembly 316 as indicated by block 1008. However, a variety of other components and systems can be sterilized as well as indicated by block 1010. In order to sterilize burner assembly 324, a variety of different techniques may be used, but, in one example, burner assembly 324 may be sterilized by generating an initial flame to burn off contaminants present within burner assembly 324 as indicated by block 1004. However, burner assembly 316 can be sterilized using a variety of other techniques as well as indicated by block 1006.

Once burner assembly 316 is sterilized, processing proceeds to block 1048 where controller 226 generates control signals for power supply 320 to generate power to selectively bias burner assembly 324. In one example, this includes biasing end cap 328 and burner cell 302, as indicated by block 1050, to allow a disassociated ion-electron pair created within flame 322 to maintain a disassociated state. However, other components may be biased as well as indicated by block 1052.

Processing then turns to block 1012 where controller 226 generates control signals for gas delivery subsystem 304 to provide zero-air sample 310 to burner cell 302. Upon receiving the zero-air sample 310, controller 226 generates control signals for ignitor 414 to generate flame 322 within burner assembly 324 as indicated by block 1014.

Control signals are subsequently generated for gas delivery subsystem 304 to provide a sample/hydrogen mixture to burner assembly 324 as indicated by block 1016. An ion-electron pair is subsequently generated within flame 322 resulting from sample 308. As flame 322 burns within burner assembly 324, a flame affluent, comprising the disassociated ion-electron pair, acts on probe assembly 316 within burner assembly 324. Processing subsequently turns to block 1018 where controller 226 generates control signals for vacuum subsystem 318 to reduce a pressure within burner assembly 324. While a variety of pressures may be obtained within burner assembly 324, in one example, a pressure can correspond to 10 [kPa] as indicated by block 1020. However, other pressures may be obtained as well as indicated by block 1022.

Upon establishing a desired pressure within burner assembly 324, processing proceeds to block 1030 where controller 226 receives sensor signals from sensor(s) 332 indicative of operating characteristics of burner assembly 324. In one example, sensor(s) 332 can include a temperature sensor, coupled to burner assembly 324, configured to generate sensor signals indicative of an operating temperature of burner assembly 324 as indicated by block 1032. In this example, prior to collecting scattering data for probe assembly 316, controller 226 can receive sensor signals and wait a predetermined duration to allow a burner assembly temperature to stabilize. However, other characteristics of burner assembly 324 can be determined as well as indicated by block 1034.

Once various characteristics of burner assembly 324 are determined and, in some examples, allowed to stabilize, processing turns to block 1036 where controller 226 receives signals from meter 314 indicative of scattering parameters of probe assembly 316. In one example, scattering parameters can include $S_{11}$ parameters, as indicated by block 1038. Upon receiving the signals from meter 314, controller 226 can determine a resonant frequency and quality factor of probe assembly 316 based on the determined scattering parameters as indicated by block 1040. Once a resonant frequency and quality factor are determined for probe assembly 316, controller 226 can determine an ion concentration present within sample 308 as indicated by block 1042. In one example, to determine an ion concentration, controller 226 determines an electric permittivity surrounding probe assembly 316 based on the resonant frequency of probe assembly 316.

For example, an electric permittivity surrounding probe assembly 316 depends on an ion concentration proximate probe assembly 316. An ion concentration proximate probe assembly 316 is related to a concentration of ions present within flame 322. Therefore, based on a calculated electric permittivity adjacent to probe assembly 316, controller 226 can determine an ion concentration within sample 308 as it forms disassociated ion-electron pairs within flame 322. However, other characteristics and parameters of burner assembly 324 can be determined as well as indicated by block 1044.

Once an ion concentration is determined for sample 308, processing turns to block 1046 where it is determined whether there are additional samples. If there are additional samples from chromatographic columns, processing reverts back to block 1016 where controller 226 generates control signals for gas delivery subsystem 304 to provide a hydrogen/sample mixture to burner cell 302. If there are no additional samples, processing subsequently ends.

Although the present invention has been described with reference to preferred embodiments, workers skilled in the art will recognize that changes may be made in form and detail without departing from the spirit and scope of the invention.

What is claimed is:

1. A microwave resonator flame ionization detector assembly, comprising:
    a microwave resonator disposed proximate a flame to evaluate an ion concentration in a flame effluent;
    a meter coupled to the resonator and configured to detect a reflection coefficient of the resonator as the flame effluent acts on the resonator and generate signals indicative of the reflection coefficient;
    wherein a resonant frequency of the resonator is detected, and the reflection coefficient of the resonator is used to determine an electric permittivity of a material in which the resonator is immersed;
    a controller coupled to the meter and configured to receive the signals from the meter coupled to the resonator and, based on the signals, determine the electric permittivity of the material in which the resonator is immersed;
    wherein the electric permittivity depends on an ion concentration proximal to the resonator, and wherein the ion concentration is related to the concentration of hydrocarbons present in the flame.

2. The microwave resonator flame ionization detector assembly of claim 1, and further comprising:
    a burner assembly configured to n:xeive a gas sample that includes the concentration of hydrocarbons from a gas delivery subsystem and generates the flame based on the gas sample.

3. The microwave resonator flame ionization detector assembly of claim 2,
    wherein the resonator comprises a hairpin resonator coupled to the burner assembly as part of a probe assembly.

4. The microwave resonator flame ionization detector assembly of claim 1,
    wherein the meter comprises a reflectometer or a network analyzer configured to sense the reflection coefficient of the resonator.

5. The microwave resonator flame ionization detector assembly of claim 1, wherein the controller is further configured to determine the concentration of hydrocarbons within the gas sample based on the electric permittivity of the material in which the resonator is immersed.

6. The microwave resonator flame ionization detector assembly of claim 1, wherein the reflection coefficient comprises Su parameter information.

7. The microwave resonator flame ionization detector assembly of claim 2, wherein the burner assembly comprises:
    an envelope configured to house the flame;
    an end cap configured to couple to both the envelope and the resonator; and
    a burner cell coupled to the envelope configured to receive the gas sample from the gas delivery subsystem and generate the flame.

8. The microwave resonator flame ionization detector assembly of claim 7, wherein the burner cell comprises:
    a burner tip configured to orient the flame within the envelope;
    a plug coupled to the gas delivery subsystem configured to receive the gas sample from the gas delivery subsystem;
    a port coupled to the gas delivery subsystem configured to receive a different gas sample from the gas delivery subsystem; and
    an ignitor configured to receive electrical power from a power supply and generate the flame.

9. The microwave resonator flame ionization detector assembly of claim 3, wherein the probe assembly comprises:
    a feed line coupled to the resonator using a direct coupling between the feed line and the resonator; and
    an adapter coupled to the feed line and the meter.

10. A method of sensing hydrocarbons in a gas sample using the microwave resonator flame ionization detector assembly of claim 1, comprising the steps of:
    subjecting the gas sample to the flame to generate ions;
    providing the microwave resonator proximate the ions;
    detecting a characteristic of the resonator while the resonator is subjected to the ions: and
    detecting the concentration of hydrocarbons in the gas sample based on the detected characteristic of the resonator.

11. The method of claim 10, wherein subjecting the gas sample to the flame comprises:
    generating control signals for a gas delivery subsystem to provide the gas sample to a burner assembly configured to generate the flame;
    generating control signals for a vacuum subsystem to reduce a pressure within the burner assembly; and
    generating control signals for a power supply coupled to the burner assembly to electrically bias the burner assembly to maintain an ion-electron disassociation within the burner assembly.

12. The method of claim 10, detecting the characteristic of the resonator comprises:
    receiving signals from the meter coupled to the resonator indicative of the characteristics of the resonator, wherein the characteristic corresponds to a scattering parameter of the resonator; and
    determining the scattering parameter of the resonator based on the received signals.

13. The method of claim 12, wherein detecting the concentration of hydrocarbons comprises:
    determining the resonant frequency and a quality factor of the resonator based on the scattering parameter of the resonator;
    determining the electric permittivity of an area proximate the resonator based on the determined resonant frequency of the resonator: and
    determining the ion concentration within the gas sample based on the determined electric permittivity of the area proximate the resonator.

14. The method of claim 12, wherein the meter comprises a reflectometer or a network analyzer configured to measure the scattering parameter of the resonator.

15. A gas chromatograph comprising the microwave resonator flame ionization detector of claim 1, and further comprising:
  a network analyzer or reflectometer coupled to the microwave resonator flame ionization detector to evaluate characteristics of the microwave resonator flame ionization detector.

16. The gas chromatograph of claim 15 wherein the microwave resonator flame ionization detector further comprises:
  a burner assembly configured to receive a gas sample from a gas delivery subsystem and generate the flame comprising the gas sample; and
  a probe assembly coupled to the burner assembly configured to receive the flame effluent from the flame, the probe assembly comprising the resonator configured to receive the flame effluent.

17. The gas chromatograph of claim 16, further comprising:
  the controller coupled to the network analyzer or reflectometer configured to receive signals from the network analyzer or reflectometer indicative of a scattering parameter of the resonator as the resonator receives the flame effluent.

18. The gas chromatograph of claim 17, wherein the controller is further configured to determine the electric permittivity of an area proximate the resonator based on the received signals from the network analyzer or reflectometer, and, based on the electric permittivity, the hydrocarbon ion concentration within the gas sample.

* * * * *